US012744425B2

(12) United States Patent
Soentgerath et al.

(10) Patent No.: US 12,744,425 B2
(45) Date of Patent: Sep. 22, 2026

(54) ELECTRIC MACHINE WITH A CLOSED COOLANT CIRCUIT, IN PARTICULAR FOR DRIVING A VEHICLE

(71) Applicant: Valeo eAutomotive Germany GmbH, Erlangen (DE)

(72) Inventors: Philipp Soentgerath, Bad Neustadt a.d.Saale (DE); Boris Dotz, Bad Neustadt a.d.Saale (DE)

(73) Assignee: Valeo eAutomotive Germany GmbH, Erlangen (DE)

(*) Notice: Subject to any disclaimer, the term of this patent is extended or adjusted under 35 U.S.C. 154(b) by 216 days.

(21) Appl. No.: 18/391,012

(22) Filed: Dec. 20, 2023

(65) Prior Publication Data

US 2024/0204607 A1 Jun. 20, 2024

(30) Foreign Application Priority Data

Dec. 20, 2022 (DE) .................... 10 2022 134 151.8

(51) Int. Cl.

| | |
|---|---|
| ***H02K 5/20*** | (2006.01) |
| ***H02K 1/20*** | (2006.01) |
| ***H02K 1/32*** | (2006.01) |
| ***H02K 3/24*** | (2006.01) |
| ***H02K 5/16*** | (2006.01) |
| ***H02K 9/19*** | (2006.01) |
| ***H02K 9/197*** | (2006.01) |

(52) U.S. Cl.

CPC ................ *H02K 5/20* (2013.01); *H02K 1/20* (2013.01); *H02K 1/32* (2013.01); *H02K 3/24* (2013.01); *H02K 5/161* (2013.01); *H02K 5/203* (2021.01); *H02K 9/19* (2013.01); *H02K 9/197* (2013.01)

(58) Field of Classification Search

CPC ........... H02K 1/20; H02K 1/32; H02K 5/203; H02K 9/19; H02K 9/197

See application file for complete search history.

(56) References Cited

U.S. PATENT DOCUMENTS

| | | | | |
|---|---|---|---|---|
| 3,060,335 | A * | 10/1962 | Greenwald | H02K 5/203 310/58 |
| 3,521,094 | A * | 7/1970 | Widder | H02K 9/197 310/58 |
| 3,800,174 | A * | 3/1974 | Butterfield | H02K 9/19 310/61 |
| 4,574,210 | A * | 3/1986 | Wieland | H02K 9/06 310/67 R |
| 6,191,511 | B1 | 2/2001 | Zysset | |
| 6,329,731 | B1 * | 12/2001 | Arbanas | F16H 57/043 310/58 |
| 11,271,456 | B2 * | 3/2022 | Huang | H02K 9/197 |

(Continued)

FOREIGN PATENT DOCUMENTS

| | | | | |
|---|---|---|---|---|
| CN | 106953467 A * | 7/2017 | | H02K 5/20 |
| DE | 1 613 265 B1 | 1/1971 | | |

(Continued)

*Primary Examiner* — Daniel K Schlak

(74) *Attorney, Agent, or Firm* — Oblon, McClelland, Maier & Neustadt, L.L.P.

(57) ABSTRACT

An electric machine with a housing, a rotor with a rotor cooling channel, and a stator with stator cooling channels. The housing has a distribution system for guiding a coolant flow from the rotor cooling channel to the stator cooling channels.

7 Claims, 4 Drawing Sheets

(56) References Cited

U.S. PATENT DOCUMENTS

2012/0080286 A1* 4/2012 Kasuya .................... B60K 6/48 192/113.3
2013/0270939 A1* 10/2013 Brandl ................... H02K 5/203 310/54
2014/0042841 A1* 2/2014 Rippel ................... H02K 9/193 310/54
2014/0077635 A1* 3/2014 Hossain ................. H02K 15/12 310/64
2015/0042185 A1* 2/2015 Buttner .................. H02K 9/193 310/54
2018/0269743 A1* 9/2018 Büttner ................ F16J 15/3404
2019/0006914 A1* 1/2019 Graves .................. F16H 57/046
2020/0036249 A1* 1/2020 Krais ..................... H02K 9/197
2020/0244123 A1* 7/2020 Kang ....................... H02K 9/19
2020/0251963 A1* 8/2020 Woody ..................... H02K 5/18
2021/0376685 A1* 12/2021 Hacklberger .......... H02K 5/203
2022/0239122 A1* 7/2022 Baumann ............. G01R 31/367
2022/0302795 A1* 9/2022 Barden .................... H02K 1/32
2023/0024621 A1* 1/2023 Holzlöhner .......... H02K 5/1732
2023/0198321 A1* 6/2023 Andersson ............. H02K 9/197 310/54
2023/0264553 A1* 8/2023 Ling ........................ B60K 1/00 310/54
2024/0100936 A1* 3/2024 Trudel ................... B60K 11/02
2024/0120798 A1* 4/2024 Kamichika .............. B60K 1/02
2024/0154501 A1* 5/2024 Kamichika .............. H02K 3/24
2024/0204620 A1* 6/2024 Soentgerath ............. H02K 1/32
2024/0333076 A1* 10/2024 Ono ......................... H02K 9/19
2024/0372440 A1* 11/2024 Sever ..................... H02K 21/14
2025/0137530 A1* 5/2025 Gassmann .......... F16H 57/0476
2025/0158460 A1* 5/2025 Fujima ..................... H02K 5/10
2025/0239915 A1* 7/2025 Zhang ...................... H02K 3/24
2026/0025035 A1* 1/2026 Pasquale .................. H02K 1/32

FOREIGN PATENT DOCUMENTS

DE 10 2010 064 010 A1 6/2012
DE 102015217875 A1 * 3/2017 ............. H02K 5/124
JP H0951657 A * 2/1997 ............... H02K 9/19

* cited by examiner

V
IV
III
28
10
16
14
1
2
16
III
IV
V 30
14
28
2
18
3
8
32
30
7
9
26
34
1

ELECTRIC MACHINE WITH A CLOSED COOLANT CIRCUIT, IN PARTICULAR FOR DRIVING A VEHICLE

BACKGROUND OF THE INVENTION

Field of the Invention

The invention relates to an electric machine, in particular for an electric motor of the type which is used for driving vehicles. The vehicles can be in particular commercial vehicles or passenger cars driven either entirely with electric energy or hybrid vehicles. The invention further relates to an electric machine with such rotor.

Description of the Related Art

It is known that electric machines used for driving vehicles should be cooled in order to prevent that the waste heat generated during operation results in excessively high temperatures. It is known to guide a coolant (for example oil) through certain parts of the electric machines so as to transport the waste heat to an external heat exchanger where it is discharged towards the environment.

Numerous designs of coolant paths are known in the prior art. The object of the invention is to provide a rotor for an electric machine in which the path for the coolant can be formed in a simple manner.

BRIEF SUMMARY OF THE INVENTION

In order to solve this object, the invention provides an electric machine with a housing, a rotor with a rotor cooling channel, and a stator with stator cooling channels, the housing having a distribution system for guiding a coolant flow from the rotor cooling channel to the stator cooling channels. The invention is based on the concept of a closed coolant circuit for guiding the coolant through both the rotor and the stator. "Closed coolant circuit" here refers to a coolant circuit in which the amount of coolant guided to the stator cooling channels is the same amount as guided into the rotor cooling channel (apart from small, unintended losses).

Preferably, a collecting area for collecting the coolant flow exiting from the rotor cooling channel is provided, the housing further having a forwarding channel for guiding the coolant flow from the collecting area to the stator cooling channels. The collecting area ensures that the entire volume of coolant introduced into the rotor is collected and forwarded to the stator for cooling.

According to an embodiment, a coolant inlet for guiding a coolant flow into the rotor cooling channel is provided such that the coolant can be guided into the rotor coolant channel without losses.

According to a preferred embodiment, the coolant inlet, the collecting area and the forwarding channel are formed in a coolant cap which constitutes an axial end part of the housing. The coolant cap has a double function of serving as an axial cover of the housing and as a collecting structure for the coolant, thus requiring few separate components so that the mounting process is simplified.

Preferably, the coolant cap is made from metal, in particular from cast metal, so that complex structures can be easily formed.

According to a preferred embodiment, the coolant cap carries a bearing for a shaft of the rotor so that at compact design is achieved.

The rotor cooling channel can be provided within a rotor shaft so that leakages can be prevented which might otherwise occur if the coolant was guided through the stack of rotor laminations arranged on the rotor.

In a preferred embodiment, the rotor cooling channel is closed at one of its axial ends so that all structure for guiding the coolant can be provided in a unified manner at one axial end of the rotor.

The coolant inlet can formed by a projection which extends into the rotor coolant channel so as to generate a coolant jet extending into the rotor shaft, whereby guaranteeing that the coolant flow reaches the axial end of the rotor shaft which is opposite to the coolant inlet.

The coolant cap preferably comprises a central cavity in which an open axial end of the rotor shaft is arranged, the cavity receiving a coolant guiding element having the projection and forming the collecting area. The coolant guiding element is an elements formed separate from the coolant cap so that complicated coolant guiding structures can be manufactured without having to resort to excessively complicated injection molding tools.

The rotor cooling channel, the collecting area, the forwarding channel and the stator cooling channels are connected in series so as to receive the entire coolant flow, requiring only a single coolant pump.

The stator cooling channels extend in an axial direction along the outer surface of the stator so that the stator can be cooled in a homogenous manner.

BRIEF DESCRIPTION OF THE SEVERAL VIEWS OF THE DRAWINGS

The invention will now be described with reference to an embodiment which is shown in the enclosed drawings. In the drawings.

DETAILED DESCRIPTION OF THE INVENTION

Figure 1:
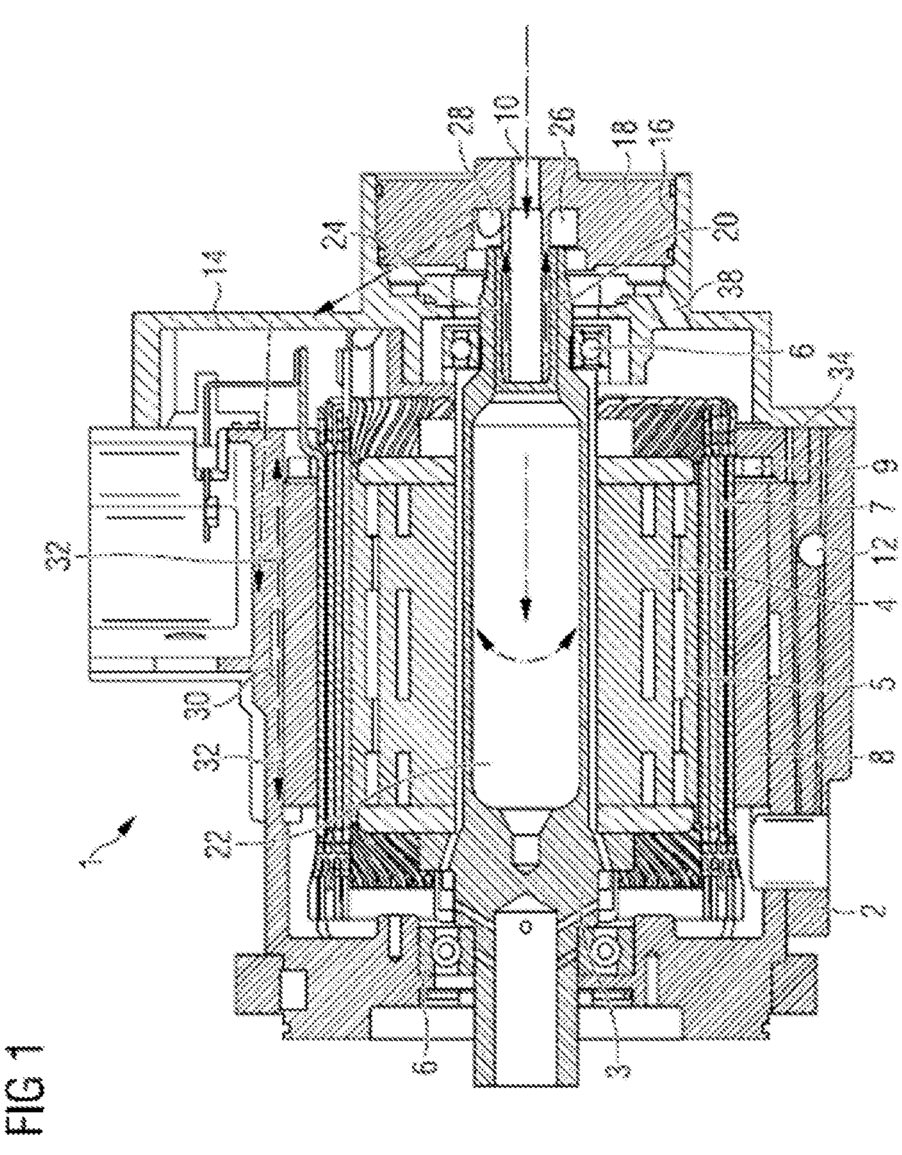
FIG. 1 shows a cross section through an electric machine.
Figure 2:
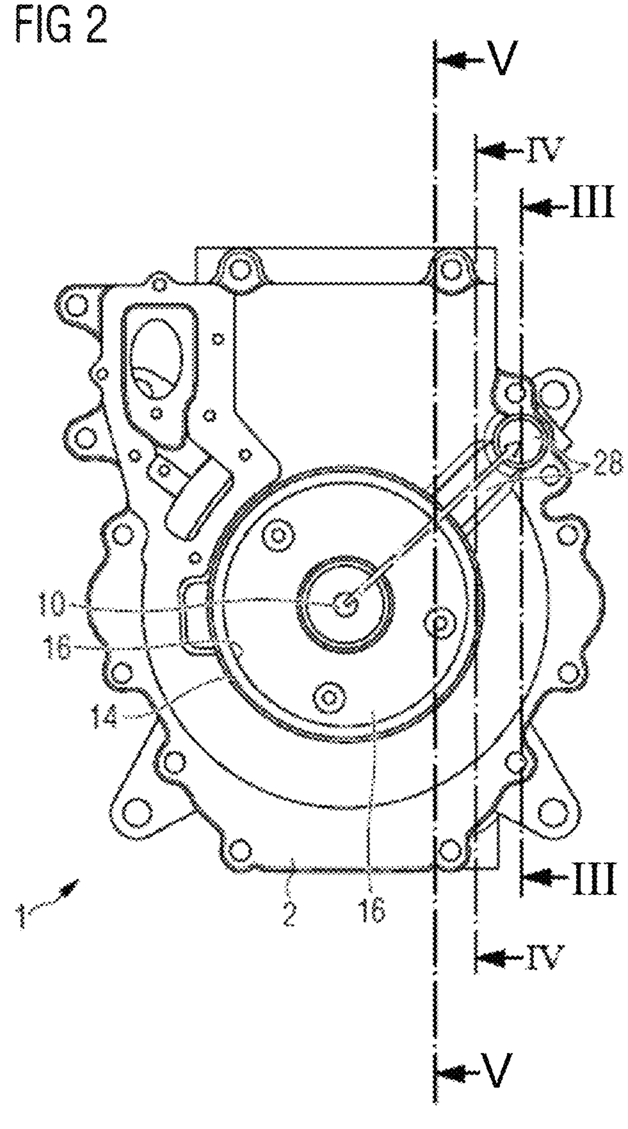
FIG. 2 shows a partly sectioned end view of the electric machine of FIG. 1.
Figure 3:
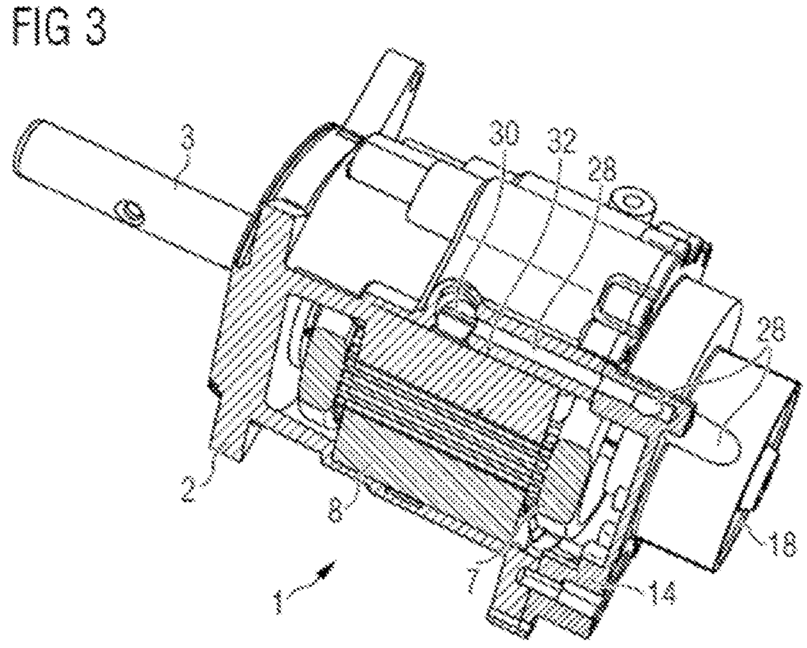
FIG. 3 shows in a perspective view the electric machine sectioned along plane III-III of FIG. 2.
Figure 4:
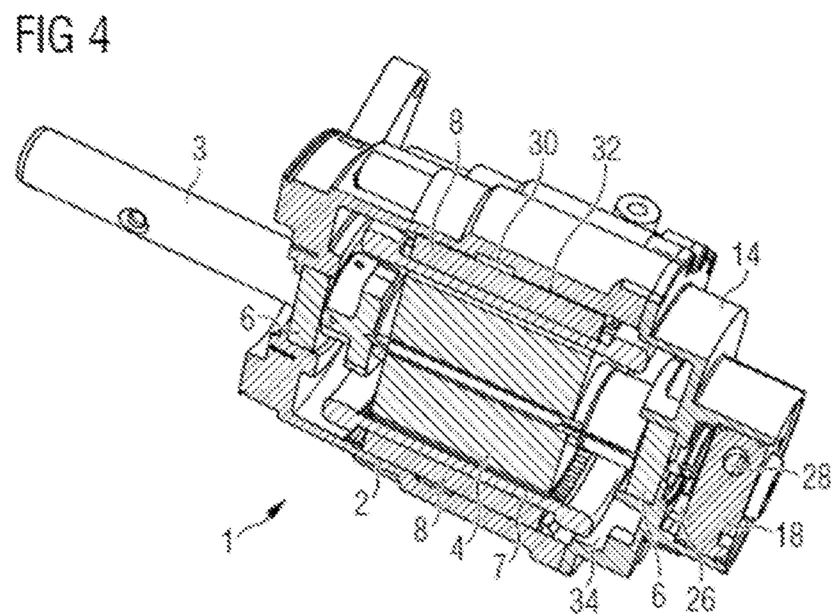
FIG. 4 shows in a perspective view the machine of FIG. 1 in a cross section along plane IV-IV of FIG. 2.
Figure 5:
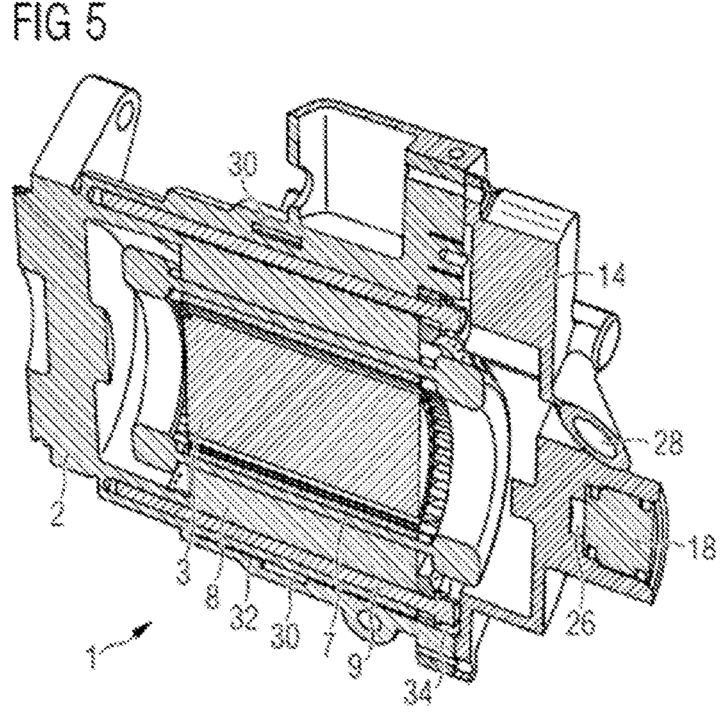
FIG. 5 shows in a perspective view the electric machine in a cross section along plane V-V of FIG. 2.

In FIGS. 1 to 5, an electric machine 1 is shown which is adapted for being used as an electric motor for driving a vehicle such as a commercial vehicle or a passenger car.

The electric machine 1 has a housing 2 in which a rotor is rotatably mounted. The rotor has a rotor shaft 3, a stack of rotor laminations 4, and permanent magnets 5 held in pockets in rotor laminations 4.

Roller bearings 6 are provided at both axial ends of the rotor 4 mounting rotor shaft 3 in a rotatable manner.

A stator is mounted within housing 2, with the stator being formed from stator windings 7 and a carrier element 8 which is mounted within housing 2 by a plurality of screws 9.

Electric machine 1 is provided with a closed coolant path for guiding a coolant (in particular oil) through the electric machine from a coolant inlet 10 through the rotor towards the stator. In other words: the coolant flow through the stator is connected in series with the coolant flow through the rotor. To this end, a distribution system for guiding a coolant flow from the rotor to the stator is implemented.

Coolant inlet 10 is formed at a coolant cap 14 which forms a cover attached to an axial end of housing 2. Coolant cap 14 carries one of the roller bearings 6 and is made from metal, in particular from cast metal.

Coolant cap 14 is provided with a central cavity 16 in which a coolant guiding element 18 is received. Coolant guiding element 18 has a central opening which forms coolant inlet 10 and has at its inner side a projection 20 which extends towards and into rotor shaft 3.

As can be seen in particular in FIG. 1, rotor shaft 3 is hollow so that an internal rotor cooling channel 22 is formed. Looking at FIG. 1, rotor cooling channel 22 is open at the right end of rotor shaft 3 which is the end where projection 20 is arranged. As rotor shaft 3 extends beyond roller bearing 6 towards coolant guiding element 18, projection 20 extends with the majority of its lengths into the interior of rotor shaft 3. In other words, there is a significant overlap between the axially extending projection 20 and the hollow rotor shaft 3.

Axially inwardly from the forward end of projection 20, the inner diameter of rotor cooling channel 22 increases so that rotor shaft 3 has a relatively thin remaining wall thickness. This is beneficial as regards the transfer of heat from rotor laminations 4 towards the coolant present within rotor cooling channel 22.

Coolant entering via coolant inlet 10 and projection 20 into rotor cooling channel 22 leaves the interior of rotor shaft 3 via an annular discharge channel 24 formed between the outer surface of projection 20 and the inner surface of the surrounding portion of rotor shaft 3.

After exiting discharged channel 24, the coolant is collected in a collecting area 26 formed in coolant guiding element 18. Collecting area 26 opens towards a forwarding channel 28 which is formed in coolant guiding element 18, coolant cap 14 and housing 2 (please see in particular FIGS. 3, 4 and 5).

Forwarding channel 28 opens towards a distribution channel 30 extending circularly around the stator and distributing the coolant among stator cooling channels 32 which extend in an axial direction along the outer surface of carrier element 8.

The coolant exits at the opposite axial ends of stator cooling channels 32. Up to the opposite axial ends of the stator cooling channels 32, the coolant flow path is closed, and all elements thereof are arranged in series. In other words, the entire coolant flow entering via coolant inlet 10 arrives at the stator cooling channels 32 (apart from small, unintended leakage).

The coolant exiting from the axial ends of stator cooling channels 32 is guided onto the axial ends of stator winding 7 (the winding heads) and is collected in a sump 34 at the bottom of housing 2. From sump 34, the coolant exits towards coolant outlet 12.

Any coolant leaking through a seal 36 between coolant guiding element 18 and rotor shaft 3 is collected via a leakage bore 38 and is also collected in sump 34.

It can be seen that the entire coolant flow entering via coolant inlet 10 is guided through the rotor and the stator and finally towards coolant outlet 12. This results in a coolant flow which can be controlled in a very precise manner.

The invention claimed is:

1. An electric machine comprising:

a housing, a rotor with a rotor cooling channel, and a stator with stator cooling channels, the housing having a distribution system for guiding a coolant flow from the rotor cooling channel to the stator cooling channels, wherein a collecting area for collecting the coolant flow exiting from the rotor cooling channel is provided, the housing further having a forwarding channel for guiding the coolant flow from the collecting area to the stator cooling channels, wherein a coolant inlet for guiding a coolant flow into the rotor cooling channel is provided, wherein the coolant inlet, the collecting area, and the forwarding channel are formed in a coolant cap which constitutes an axial end part of the housing, wherein the coolant cap carries a bearing for a shaft of the rotor, wherein the rotor cooling channel is provided within a rotor shaft, wherein one axial end of the rotor cooling channel is closed, wherein the coolant inlet is formed by a projection which extends into the rotor coolant channel, wherein the coolant cap comprises a central cavity in which an open axial end of the rotor shaft is arranged, the coolant cap comprising the projection and forming the collecting area, and wherein the coolant cap is a monolithic unitary structure.

2. The electric machine of claim 1, wherein the coolant cap is made from metal.

3. The electric machine of claim 1, wherein the central cavity receives a coolant guiding element having the projection.

4. The electric machine of claim 1, wherein the rotor cooling channel, the collecting area, the forwarding channel and the stator cooling channels are connected in series so as to receive the entire coolant flow.

5. The electric machine of claim 1, wherein the stator is formed from stator windings and a carrier element, the stator cooling channels extending in an axial direction along the outer surface of the carrier element.

6. The electric machine of claim 5, wherein coolant exiting from axial ends of the stator cooling channels is guided onto axial ends of the stator winding.

7. The electric machine of claim 6, wherein the coolant that is guided onto the axial ends of the stator winding is collected in a sump at a bottom of the housing.

* * * * *